United States Patent
Seo et al.

(10) Patent No.: US 11,190,332 B2
(45) Date of Patent: *Nov. 30, 2021

(54) OPERATION METHOD OF COMMUNICATION NODE FOR TIME SYNCHRONIZATION IN VEHICLE NETWORK

(71) Applicants: HYUNDAI MOTOR COMPANY, Seoul (KR); KIA MOTORS CORPORATION, Seoul (KR)

(72) Inventors: Kang Woon Seo, Seoul (KR); Dong Ok Kim, Goyang-si (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 14 days.

This patent is subject to a terminal disclaimer.

(21) Appl. No.: 16/747,960

(22) Filed: Jan. 21, 2020

(65) Prior Publication Data

US 2020/0162232 A1 May 21, 2020

Related U.S. Application Data

(62) Division of application No. 15/814,855, filed on Nov. 16, 2017, now Pat. No. 10,574,433.

(30) Foreign Application Priority Data

Nov. 22, 2016 (KR) .................. 10-2016-0155966
Sep. 15, 2017 (KR) .................. 10-2017-0118284

(51) Int. Cl.
*H04L 7/00* (2006.01)
*H04L 12/26* (2006.01)

(52) U.S. Cl.
CPC ........ *H04L 7/0033* (2013.01); *H04L 43/0852* (2013.01); *H04L 43/0858* (2013.01); *H04L 43/16* (2013.01)

(58) Field of Classification Search
None
See application file for complete search history.

(56) References Cited

U.S. PATENT DOCUMENTS

2012/0136956 A1 5/2012 Khoury et al.
2013/0208735 A1 8/2013 Mizrahi et al.
(Continued)

OTHER PUBLICATIONS

U.S. Notice of Allowance dated Oct. 17, 2019 issued in U.S. Appl. No. 15/814,855.

(Continued)

*Primary Examiner* — Ruihua Zhang
(74) *Attorney, Agent, or Firm* — Morgan, Lewis & Bockius LLP

(57) ABSTRACT

An operation method of a first communication node among a plurality of communication nodes included in an Ethernet-based vehicle network may include steps of measuring a first link delay for performing time synchronization with a second communication node included in the plurality of communication nodes; calculating a difference between the first link delay and an average value of a plurality of link delays measured before the measurement of the first link delay; comparing the calculated difference with a first threshold value for controlling a link delay measurement cycle for the second communication node; and controlling the link delay measurement cycle for the second communication node based on the comparison result.

15 Claims, 9 Drawing Sheets

(56) References Cited

U.S. PATENT DOCUMENTS

2014/0063375 A1     3/2014   Kuriki
2019/0081832 A1     3/2019   Marinier

OTHER PUBLICATIONS

U.S. Office Action dated Apr. 18, 2019 issued in U.S. Appl. No. 15/814,855.

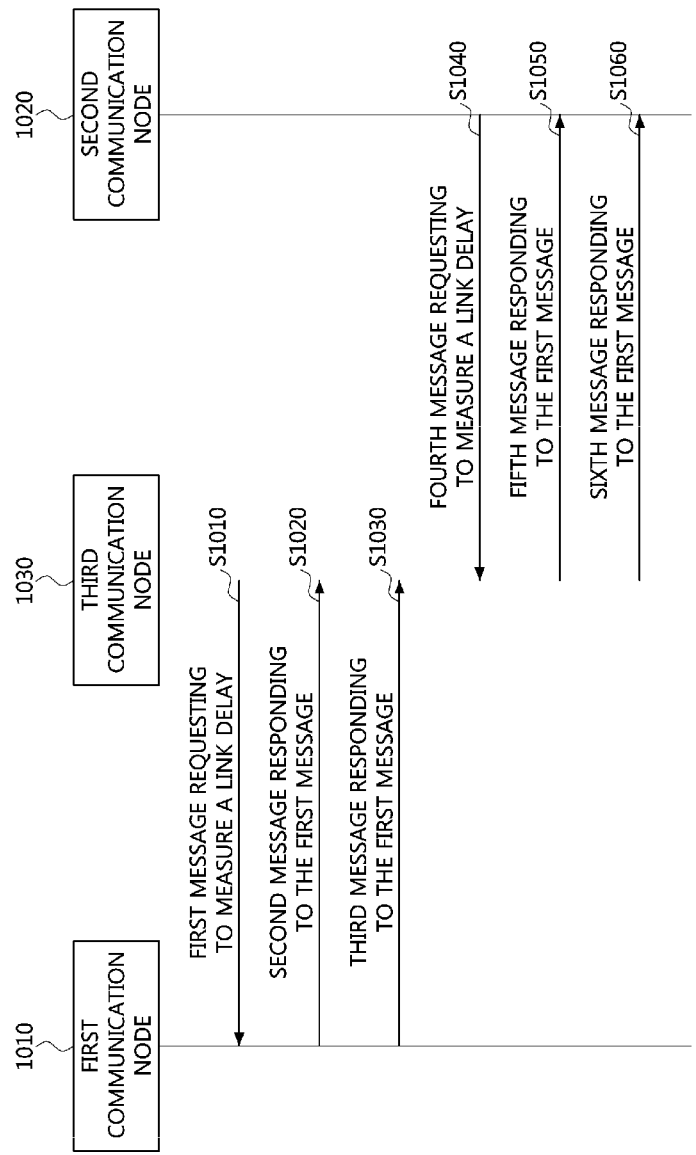

OPERATION METHOD OF COMMUNICATION NODE FOR TIME SYNCHRONIZATION IN VEHICLE NETWORK

CROSS-REFERENCE TO RELATED APPLICATIONS

This application a divisional of U.S. patent application Ser. No. 15/814,855, filed on Nov. 16, 2017, which claims the benefit of priorities to Korean Patent Applications No. 10-2016-0155966 filed on Nov. 22, 2016 and No. 10-2017-0118284 filed on Sep. 15, 2017 in the Korean Intellectual Property Office (KIPO), the entire disclosures of which are incorporated by reference as if fully set forth herein.

TECHNICAL FIELD

The present disclosure relates to an operation method of a communication node for time synchronization in a vehicle network, and more specifically, to an operation method of a communication node for controlling a transmission cycle of messages used for time synchronization based on measurements of link delays in an Ethernet-based vehicle network.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Meanwhile, the telematics system and the infotainment system, like most enhanced safety systems of a vehicle do, require higher transmission rates and system expandability. However, the CAN, FlexRay-based network, and the like may not sufficiently meet such requirements. The MOST-based network, in particular, may support a higher transmission rate than the CAN or the FlexRay-based network. However, applying the MOST-based network to vehicle networks can be costly. Due to this, an Ethernet-based network is often utilized as a vehicle network. The Ethernet-based vehicle network may support bi-directional communication through one pair of windings and may support a transmission rate of up to 10 Gbps.

Specifically, the Ethernet-based vehicle network may include a plurality of communication nodes (e.g., electronic devices and switches, etc.) that perform Ethernet-based communications. The plurality of communication nodes included in the vehicle network are required to acquire time synchronization to perform communications with each other. For this, the plurality of communication nodes periodically measure link delays between the plurality of communication nodes. Here, the plurality of communication nodes may transmit messages for measuring the link delays periodically according to a predetermined cycle even though a measured difference between the link delays is not so large. Accordingly, there is a problem that the plurality of communication nodes consume energy unnecessarily due to transmission of periodic messages and excessively frequent measurements of link delays.

SUMMARY

The present disclosure provides an operation method of a communication node for controlling a transmission cycle of messages used for time synchronization based on measurements of link delays in an Ethernet-based vehicle network.

In accordance with embodiments of the present disclosure, an operation method of a first communication node, including a processor and a memory storing at least one instruction executed by the processor, among a plurality of communication nodes included in an Ethernet-based vehicle network may include steps of measuring, by the processor, a first link delay for performing time synchronization with a second communication node included in the plurality of communication nodes; calculating, by the processor, a difference between the first link delay and an average value of a plurality of link delays measured before the measurement of the first link delay; comparing, by the processor, the calculated difference with a first threshold value for controlling a link delay measurement cycle for the second communication node; and controlling, by the processor, the link delay measurement cycle for the second communication node based on a comparison result between the calculated difference and the first threshold value.

The step of measuring a first link delay may include transmitting, to the second communication node, a first message requesting measurement of the first link delay for the second communication node; receiving, from the second communication node, a second message including information on a time at which the first message was received, and a third message including information on a time at which the second message was transmitted; and measuring the first link delay for the second communication node based on the information on the times included in the second message and the third message.

The link delay measurement cycle for the second communication node may be controlled by controlling a transmission cycle of transmitting the first message at the first communication node.

The step of controlling the link delay measurement cycle for the second communication node may include comparing the link delay measurement cycle with a second threshold value, which is a maximum value of the link delay measurement cycle, when the calculated difference is less than the first threshold value; and controlling the link delay measurement cycle based on a comparison result between the link delay measurement cycle and the second threshold value.

The step of controlling the link delay measurement cycle for the second communication node may further include setting the link delay measurement cycle to a predetermined initial value when the calculated difference is equal to or greater than the first threshold value.

The step of controlling the link delay measurement cycle for the second communication node may further include increasing the link delay measurement cycle by a predetermined length when the link delay measurement cycle is less than the second threshold value.

The step of controlling the link delay measurement cycle for the second communication node may further include maintaining the link delay measurement cycle when the link delay measurement cycle is equal to or greater than the second threshold value.

Further, in accordance with embodiments of the present disclosure, an operation method of a first communication node, including a processor and a memory storing at least one instruction executed by the processor, among a plurality of communication nodes included in an Ethernet-based vehicle network may include steps of measuring, by the processor, a first link delay for performing time synchronization with a second communication node included in the plurality of communication nodes; calculating, by the processor, a first average value of a predetermined number of link delays among the first link delay and a plurality of link delays measured before the measurement of the first link delay; calculating, by the processor, a second average value of the predetermined number of link delays among a plurality of link delays measured before the measurement procedures of the link delays for the first average value; and controlling, by the processor, a link delay measurement cycle for the second communication node based on a difference between the calculated first average value and the calculated second average value.

The step of measuring a first link delay may include transmitting, to the second communication node, a first message requesting measurement of the first link delay for the second communication node; receiving, from the second communication node, a second message including information on a time at which the first message was received, and a third message including information on a time at which the second message was transmitted; and measuring the first link delay for the second communication node based on the information on the times included in the second message and the third message.

The link delay measurement cycle for the second communication node may be controlled by controlling a transmission cycle of transmitting the first message at the first communication node.

The first average value may be calculated by including the first link delay, or is calculated without including the first link delay.

The step of controlling a link delay measurement cycle for the second communication node may include comparing the calculated difference with a first threshold value for controlling the link delay measurement cycle for the second communication node; and controlling the link delay measurement cycle for the second communication node based on a comparison result between the calculated difference and the first threshold value.

The step of controlling a link delay measurement cycle for the second communication node may further include comparing the link delay measurement cycle with a second threshold value, which is a maximum value of the link delay measurement cycle, when the calculated difference is less than the first threshold value; and controlling the link delay measurement cycle based on a comparison result between the link delay measurement cycle and the second threshold value.

The step of controlling a link delay measurement cycle for the second communication node may further include setting the link delay measurement cycle to a predetermined initial value when the calculated difference is equal to or greater than the first threshold value.

The step of controlling a link delay measurement cycle for the second communication node may further include increasing the link delay measurement cycle by a predetermined length when the link delay measurement cycle is less than the second threshold value.

The step of controlling the link delay measurement cycle for the second communication node may further comprise maintaining the link delay measurement cycle when the link delay measurement cycle is equal to or greater than the second threshold value.

Further, in accordance with embodiments of the present disclosure, a first communication node among a plurality of communication nodes included in an Ethernet-based vehicle network may include a processor and a memory storing at least one instruction executed by the processor. Also, the at least one instruction may be configured to perform steps of measuring a first link delay for performing time synchronization with a second communication node included in the plurality of communication nodes; calculating a difference between the first link delay and an average value of a plurality of link delays measured before the measurement of the first link delay; comparing the calculated difference with a first threshold value for controlling a link delay measurement cycle for the second communication node; and controlling the link delay measurement cycle for the second communication node based on a comparison result between the calculated difference and the first threshold value.

In the step of controlling the link delay measurement cycle for the second communication node, the at least one instruction may be further configured to perform steps of comparing the link delay measurement cycle with a second threshold value, which is a maximum value of the link delay measurement cycle, when the calculated difference is less than the first threshold; and controlling the link delay measurement cycle based on a comparison result between the link delay measurement cycle and the second threshold value.

In the step of controlling the link delay measurement cycle for the second communication node, the at least one instruction may be further configured to perform setting the link delay measurement cycle to a predetermined initial value when the calculated difference is equal to or greater than the first threshold value.

In the step of controlling the link delay measurement cycle for the second communication node, the at least one instruction may be further configured to perform increasing the link delay measurement cycle by a predetermined length when the link delay measurement cycle is less than the second threshold value.

In the step of controlling the link delay measurement cycle for the second communication node, the at least one instruction may be further configured to perform maintaining the link delay measurement cycle when the link delay measurement cycle is equal to or greater than the second threshold value.

In accordance with the embodiments of the present disclosure, it is made possible to reduce unnecessarily frequent transmissions of messages used for time synchronization and excessively frequent measurements of link delays. Thus, energy efficiency in the time synchronization can be achieved in the Ethernet-based vehicle network.

BRIEF DESCRIPTION OF DRAWINGS

Embodiments of the present disclosure will become more apparent by describing in detail forms of the present disclosure with reference to the accompanying drawings, in which:

FIG. 10 is a sequence chart for explaining a second embodiment of a method for measuring a link delay in a vehicle network.

Figure 1:
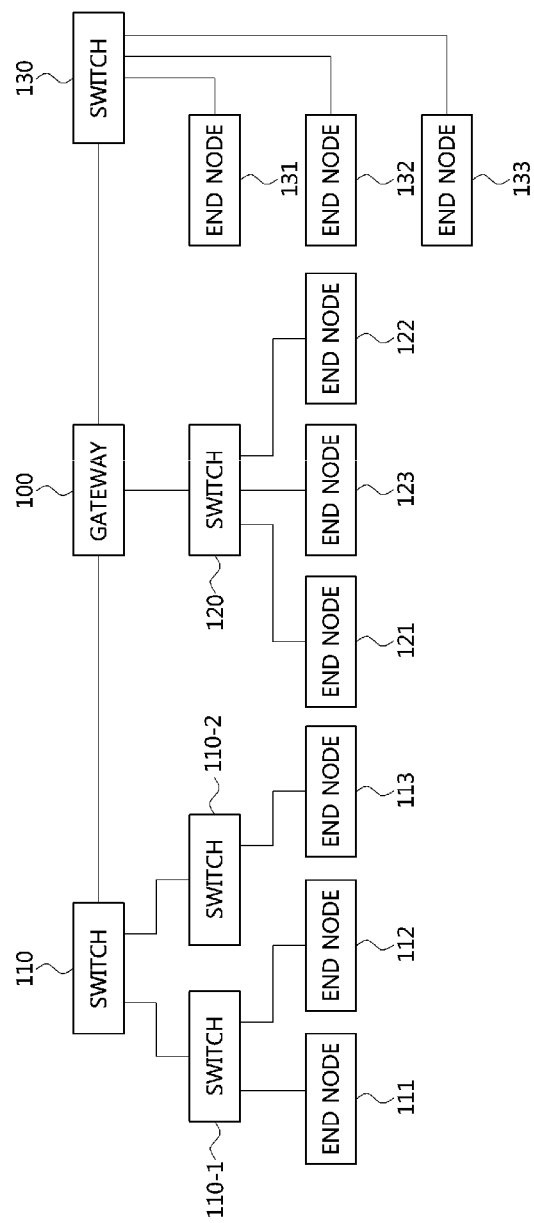
FIG. 1 is a block diagram illustrating an embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating an embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
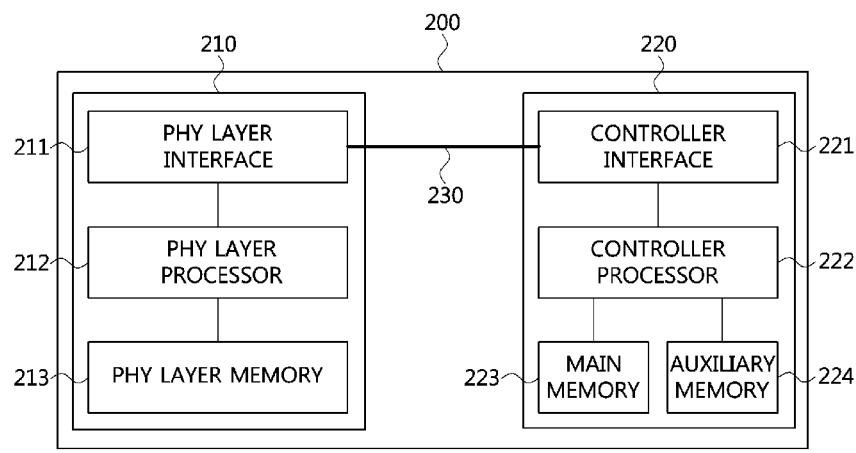
FIG. 2 is a block diagram illustrating an embodiment of a communication node belonging to a vehicle network.

FIG. 2 is a block diagram illustrating an embodiment of a communication node belonging to a vehicle network.

Referring to FIG. 2, a communication node 200 constituting a vehicle network may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

In the following description, a method performed at a communication node belonging to a vehicle network and a corresponding counterpart communication node will be described. Hereinafter, even when a method (e.g., transmission or reception of a signal) to be performed at a first communication node is described, a counterpart second communication node corresponding to the first communication node may perform a method (e.g., reception or transmission of the signal) corresponding to the method performed at the first communication node. That is, when the operation of the first communication node is described, the corresponding second communication node can perform a counterpart operation corresponding to the operation of the first communication node. Conversely, when the operation of the second communication node is described, the corresponding first communication node can perform a counterpart operation corresponding to the operation of the second communication node.

Figure 3:
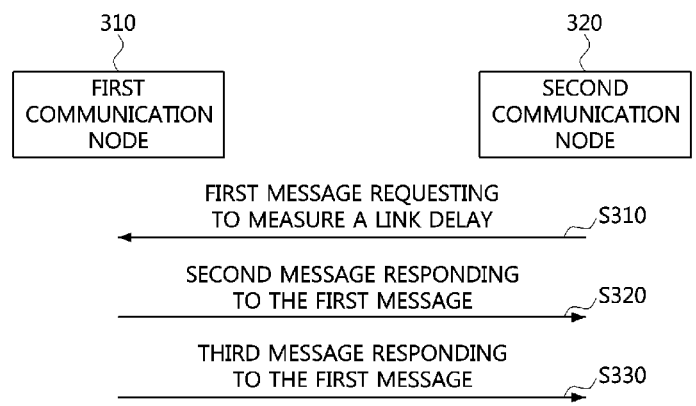
FIG. 3 is a sequence chart for explaining a first embodiment of a method for measuring a link delay in a vehicle network.

FIG. 3 is a sequence chart for explaining a first embodiment of a method for measuring a link delay in a vehicle network.

Referring to FIG. 3, a vehicle network may include a first communication node 310 and a second communication node 320. The first communication node 310 and the second communication node 320 may perform the same or similar functions as the end node shown in FIG. 1. The first communication node 310 and the second communication node 320 may be configured the same as or similarly to the communication node shown in FIG. 2. The first communication node 310 may function as a master node in the vehicle network and the second communication node 320 may function as a slave node. In the vehicle network, the first communication node 310 and the second communication node 320 may perform time synchronization to perform communications with each other.

Specifically, in order to measure a link delay between the first communication node 310 and the second communication node 320, the second communication node 320 may generate a first message requesting to measure the link delay between the first communication node 310 and the second communication node 320. The first message may include an indicator instructing measurement of the link delay between the first communication node 310 and the second communication node 320. The second communication node 320 may then transmit the first message to the first communication node 310 (S310). At this time, the second communication node 320 may store first time information (hereinafter, 'a') on a time at which the first message was transmitted to the first communication node 310.

Thereafter, in the vehicle network, the first communication node 310 may receive the first message from the second communication node 320. Then, the first communication node 310 may identify the indicator instructing the measurement of the link delay between the first communication node 310 and the second communication node 320 included in the first message. Then, the first communication node 310 may identify a time at which the first message was received from the second communication node 320, and generate a second message including second time information (hereinafter, 'b') on the identified time as a response to the first message. Then, the first communication node 310 may transmit the second message to the second communication node 320 (S320).

Also, the first communication node 310 may identify a time at which the second message was transmitted to the second communication node 320, and generate a third message including third time information (hereinafter, 'c') on the identified time as a response to the first message. The first communication node 310 may then transmit the third message to the second communication node 320 (S330).

Then, the second communication node 320 may receive the second message from the first communication node 310 as the step S320 is performed at the first communication node 310. Then, the second communication node 320 may identify the time at which the first message was received at the first communication node 310 based on the second time information b included in the second message. At this time, the second communication node 320 may identify a time at which the second message was received from the first communication node 310, and store fourth time information (hereinafter, 'd') on the identified time. Also, the second communication node 320 may receive the third message from the first communication node 310 as the step S330 is performed at the first communication node 310. Then, the second communication node 320 may identify the third time information c included in the third message, and identify the time at which the second message was transmitted from the first communication node 310 based on the third time information. Then, the second communication node 310 may calculate the link delay between the first communication node 310 and the second communication node 320 based on the first time information a, the second time information b, the third time information c, and the fourth time information d. Specifically, the link delay between the first communication node 310 and the second communication node 320 may be expressed by Equation 1 below.

$$\frac{(b-a)+(d-c)}{2} = \text{link delay} \qquad [\text{Equation 1}]$$

That is, the link delay between the first communication node 310 and the second communication node 320 may be determined by an average value of a time taken for a message to be transmitted from the first communication node 310 to the second communication node 320 and a time taken for a message to be transmitted from the second communication node 320 to the first communication node 310. Through the procedure described above, the link delay between the first communication node 310 and the second communication node 320 in the vehicle network can be measured.

Figure 4:
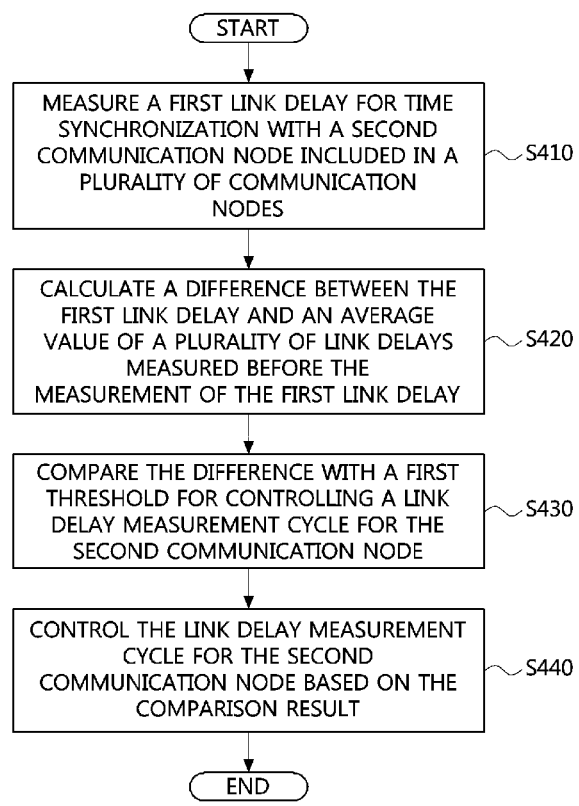
FIG. 4 is a flowchart for explaining an operation method of a communication node for time synchronization in a vehicle network according to an embodiment of the present disclosure.

FIG. 4 is a flowchart for explaining an operation method of a communication node for time synchronization in a vehicle network according to an embodiment of the present disclosure.

Referring to FIG. 4, an operation method of a communication node for time synchronization in a vehicle network according to an embodiment of the present disclosure may be performed in a first communication node among a plurality of communication nodes included in a vehicle network. The first communication node may perform the same or similar function as the end node shown in FIG. 1. The first communication node may be configured the same as or similarly to the communication node shown in FIG. 2. The first communication node may perform a function of a slave node in the vehicle network. That is, the first communication node may perform the function of the second communication node 320 described with reference to FIG. 3. The first communication node may measure a first link delay for time synchronization with a second communication node included in the plurality of communication nodes (S410). In the vehicle network, the second communication node may perform a function of a master node. That is, the second communication node may perform the functions of the first communication node 310 described with reference to FIG. 3. Specifically, a method for measuring the first link delay at the first communication node can be described with reference to FIG. 5.

Figure 5:
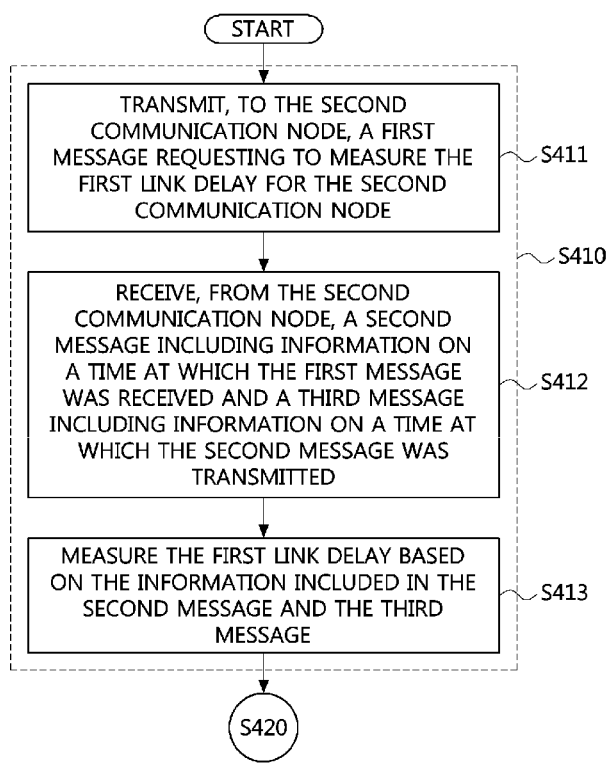
FIG. 5 is a flow chart for explaining a method of measuring a first link delay in a vehicle network according to an embodiment of the present disclosure.

FIG. 5 is a flow chart for explaining a method of measuring a first link delay in a vehicle network according to an embodiment of the present disclosure.

Referring to FIG. 5, the first communication node may generate a first message requesting measurement of a first link delay. The first communication node may then transmit to the second communication node the first message requesting measurement of the first link delay for the second communication node (S411). The first message may include an indicator that instructs measurement of a link delay between the first communication node and the second communication node.

Accordingly, the second communication node may receive the first message from the first communication node. Thereafter, the second communication node may identify the indicator instructing the measurement of the first link delay included in the first message. The second communication node may then generate a second message including information on a time at which the first message was received. The second communication node may then transmit the second message to the first communication node. Also, the second communication node may generate a third message including information on a time at which the second message was transmitted, and may transmit the generated third message to the first communication node.

Thereafter, the first communication node may receive, from the second communication node, the second message including the information on the time at which the first message was received, and the third message including the information on the time at which the second message was transmitted (S412). Then, the first communication node may calculate the first link delay for the second communication node based on the information on the times included in the second message and the third message (S413). Specifically, the method of measuring the first link delay at the first communication node may be the same as described with reference to FIG. 3.

Turning back to FIG. 4, the first communication node may calculate a difference between the first link delay and an average value of a plurality of link delays measured in the measurement procedure performed before the measurement procedure of the first link delay (S420). That is, the first communication node may periodically measure link delays between the first communication node and the second communication node as performed in the step S410, store the measured link delays for a predetermined number of times, and calculate the difference between the average value of the predetermined number of the measured link delays and the first link delay.

For example, when the predetermined number is 3 and the first link delay measured last in the first communication node is $L_n$, and a second link delay measured in the measurement procedure performed before the measurement procedure of the first link delay may be denoted by $L_{n-1}$. Also, a third link delay measured in the measurement procedure performed before the measurement procedure of the second link delay may be denoted by $L_{n-2}$, and a fourth link measured in the measurement procedure performed before the measurement procedure of the third link delay may be denoted by $L_{n-3}$. In this case, the first communication node may calculate the average value of $L_{n-1}$, $L_{n-2}$, and $L_{n-3}$ which are the plurality of link delays measured in the measurement procedure performed before the measurement procedure of the first link delay $L_n$. Then, the first communication node may calculate the difference between the calculated average value and the first link delay $L_n$. Specifically, the difference between the average value calculated at the first communication node and the first link delay $L_n$ may be expressed by Equation 2 below.

$$\frac{L_{n-3} + L_{n-2} + L_{n-1}}{3} - L_n \qquad \text{[Equation 2]}$$

Thereafter, the first communication node may compare the calculated difference with a first threshold value for controlling a link delay measurement cycle for the second communication node (S430). The first threshold value for controlling the link delay measurement cycle for the second communication node may mean a criterion for determining the degree of change in the link delay between the first communication node and the second communication node. For example, the first threshold may be set to a smaller value as the degree of change in the link delay between the first communication node and the second communication node should be determined sensitively. On the other hand, the first threshold value may be set to a larger value as the degree of change in the link delay between the first communication node and the second communication node should be determined insensitively.

Then, the first communication node may control the link delay measurement cycle for the second communication node based on the comparison result (S440). Controlling the link delay measurement cycle for the second communication node at the first communication node may mean controlling a cycle at which the first message is transmitted at the first communication node. Specifically, a method for controlling the link delay measurement cycle for the second communication node at the first communication node may be described below with reference to FIG. 6.

Figure 6:
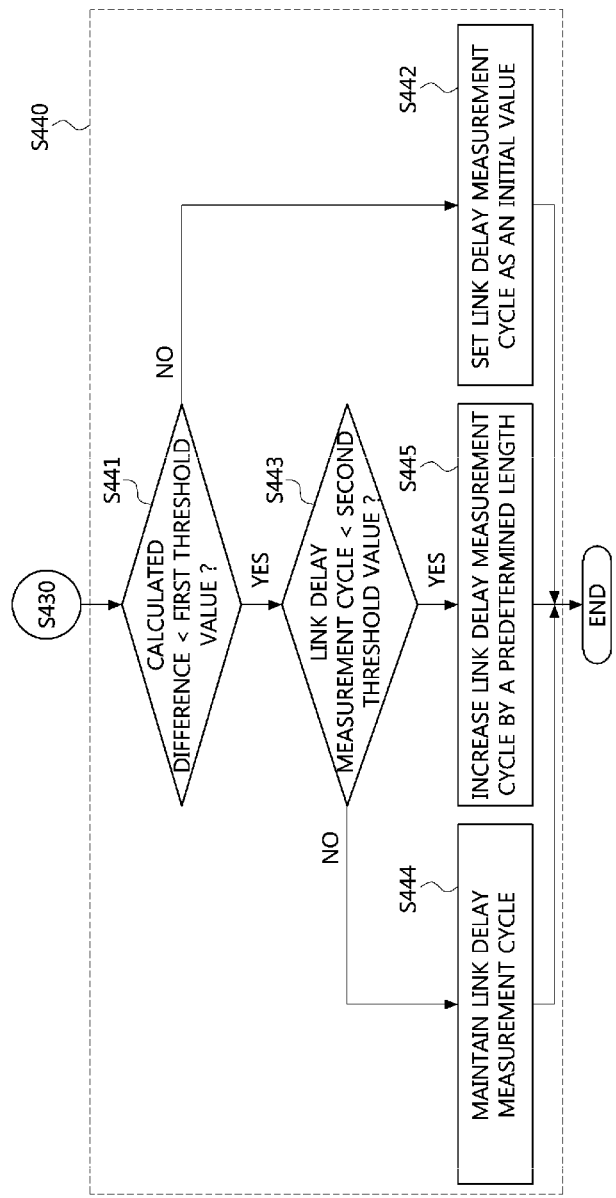
FIG. 6 is a flowchart for explaining a method of controlling a link delay measurement cycle in a vehicle network according to an embodiment of the present disclosure.

FIG. 6 is a flowchart for explaining a method of controlling a link delay measurement cycle in a vehicle network according to an embodiment of the present disclosure.

Referring to FIG. 6, the first communication node may compare the calculated difference with the first threshold value for controlling the link delay measurement cycle for the second communication node (S441). That is, comparing the difference calculated at the first communication node with the first threshold value may mean determining the degree of change of the link delay for the second communication node. For example, if the difference calculated at the first communication node is below the first threshold value, it may mean that the change in the link delay for the second communication node is not relatively large. On the other hand, if the difference calculated at the first communication node is equal to or greater than the first threshold value, it may mean that the change in the link delay for the second communication node is relatively large.

Thereafter, if the calculated difference is equal to or greater than the first threshold value, the first communication node may set the link delay measurement cycle as a predetermined initial value (S442). For example, the predetermined initial value may be set to a value that is equal to or smaller than a minimum value to which the link delay measurement cycle can be reduced.

On the other hand, if the calculated difference is less than the first threshold value, the first communication node may compare the link delay measurement cycle with a second threshold value which is a maximum value of the link delay measurement cycle (S443). The second threshold value, which is the maximum value of the link delay measurement cycle, may mean a maximum value to which the transmission cycle of the first message transmitted from the first communication node can be increased. For example, the second threshold value may be preconfigured in the first communication node. Then, the first communication node may control the link delay measurement cycle based on the comparison result between the link delay measurement cycle and the second threshold value.

Specifically, if the link delay measurement cycle is equal to or greater than the second threshold value, the first communication node may maintain the current link delay measurement cycle (S444). That is, when the link delay measurement cycle is equal to or greater than the second threshold value, the first communication node may determine that the current link delay measurement cycle is the maximum value. Accordingly, since the first communication node cannot further increase the link delay measurement cycle, the first communication node may maintain the link delay measurement cycle. On the other hand, if the link delay measurement cycle is less than the second threshold value, the first communication node may increase the link delay measurement cycle by a predetermined length (S445). The predetermined length for increasing the link delay measurement cycle at the first communication node may be preset within the maximum value to which the link delay measurement cycle can be increased.

Through the method as described above, in the vehicle network according to an embodiment of the present disclosure, the first communication node may control the link delay measurement cycle for time synchronization for the second communication node. That is, in the vehicle network, the first communication node may increase the link delay measurement cycle if the link delay for the second communication node is relatively constant. On the other hand, in the vehicle network, the first communication node may reduce the link delay measurement cycle if the link delay for the second communication node is not relatively constant. Accordingly, the first communication node in the vehicle network may reduce a load in the process of measuring the link delays during the time synchronization for the second communication node.

Figure 7:
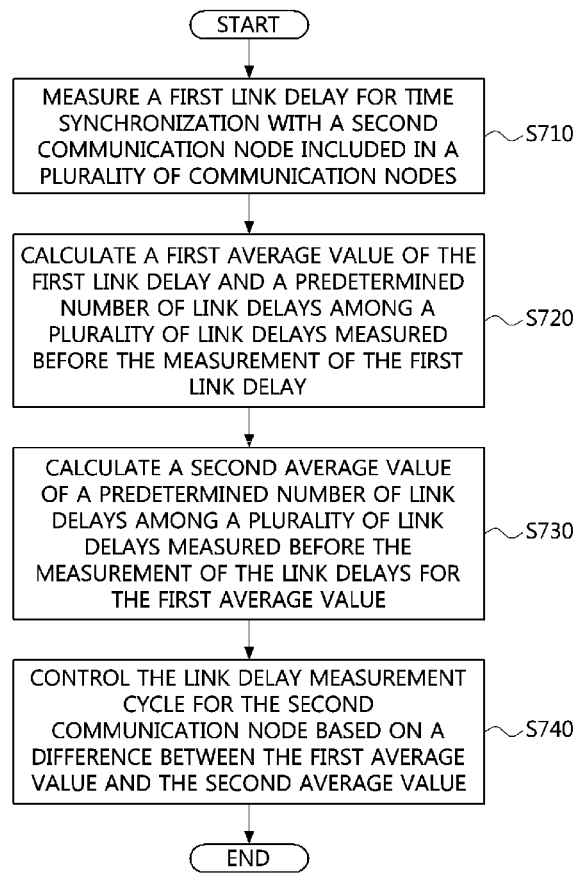
FIG. 7 is a flowchart for explaining an operation method of a communication node for time synchronization in a vehicle network according to another embodiment of the present disclosure.

FIG. 7 is a flowchart for explaining an operation method of a communication node for time synchronization in a vehicle network according to another embodiment of the present disclosure.

Referring to FIG. 7, an operation method of a communication node for time synchronization in a vehicle network according to another embodiment of the present invention may be performed in a first communication node of a plurality of communication nodes included in a vehicle network. The first communication node may perform the same or similar function as the end node shown in FIG. 1. The first communication node may be configured the same as or similarly to the communication node shown in FIG. 2. The first communication node may perform a function of a slave node in the vehicle network. That is, the first communication node may perform the function of the second communication node 320 described with reference to FIG. 3. The first communication node may measure a first link delay for performing time synchronization for a second communication node included in the plurality of communication nodes (S710). In the vehicle network, the second communication node may perform a function of a master node. That is, the second communication node may perform the functions of the first communication node 310 described with reference to FIG. 3. Specifically, a method of measuring the first link delay at the first communication node may be described with reference to FIG. 8.

Figure 8:
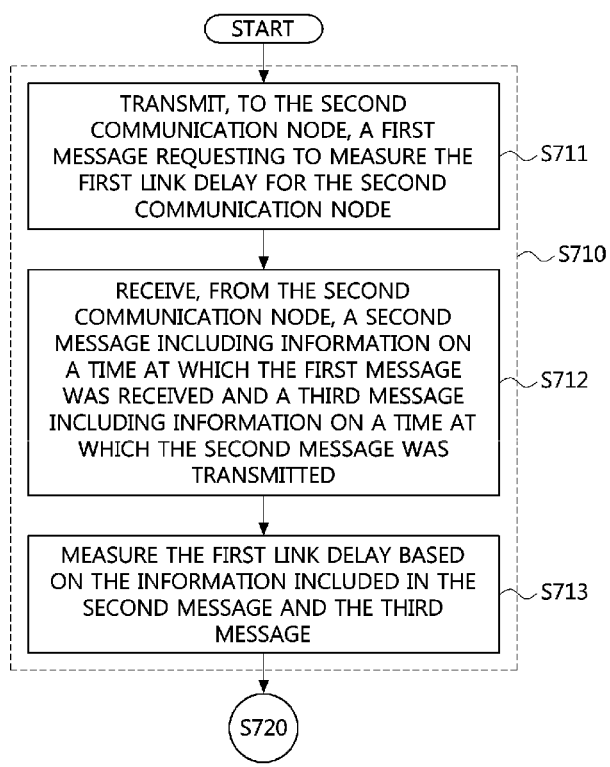
FIG. 8 is a flow chart for explaining a method of measuring a first link delay in a vehicle network according to another embodiment of the present disclosure.

FIG. 8 is a flow chart for explaining a method of measuring a first link delay in a vehicle network according to another embodiment of the present disclosure.

Referring to FIG. 8, a first communication node may generate a first message requesting to measure a first link delay for the second communication node. The first communication node may then transmit the first message to the second communication node (S711). The first message may include an indicator instructing measurement of the first link delay between the first communication node and the second communication node.

Accordingly, the second communication node may receive the first message from the first communication node. Thereafter, the second communication node may identify the indicator instructing the measurement of the first link delay included in the first message. The second communication node may then generate a second message including information on a time at which the first message was received. The second communication node may then transmit the second message to the first communication node, the second message including information on the time at which the first message was received. Also, the second communication node may generate a third message including information on a time at which the second message was transmitted, and may transmit the generated third message to the first communication node.

Thereafter, the first communication node may receive the second message and the third message from the second communication node (S712). Thereafter, the first communication node may calculate the first link delay for the second communication node based on the information on the times included in the second message and the third message respectively (S713). Specifically, the method for measuring the first link delay at the first communication node may be the same as described with reference to FIGS. 3 and 5.

Turning back to FIG. 7, the first communication node may calculate an average value of a predetermined number of link delays among a plurality of link delays measured in the measurement procedure performed prior to the measurement procedure of the first link delay (S720). That is, the first communication node may periodically measure the link delays between the first communication node and the second communication node as performed in the step S710, store the measured link delays, and calculate a first average value of the predetermined number of the measured link delays. Here, the link delay corresponding to the predetermined number may or may not include the first link delay. For example, a case where the first link delay is included in the link delays corresponding to the predetermined number may be described as follows.

When the predetermined number is 3 and the first link delay measured last at the first communication node is $L_n$, a second link delay measured in the measurement procedure performed before the measurement procedure of the first link delay may be denoted by $L_{n-1}$. Also, a third link delay measured in the measurement procedure performed before the measurement procedure of the second link delay may be denoted by $L_{n-2}$. In this case, the first communication node may calculate the first average value of three link delays including the first link delay $L_n$, the second link delay $L_{n-1}$, and the third link delay $L_{n-2}$. Specifically, the first average value calculated at the first communication node may be expressed by Equation 3.

$$\frac{L_n + L_{n-1} + L_{n-2}}{3} \qquad \text{[Equation 3]}$$

Thereafter, the first communication node may calculate a second average value of a predetermined number of link delays among the plurality of link delays measured in the measurement procedure performed before measurements of the link delays for the first average value (S730). That is, the first communication node may calculate the second average value, which is an average value of link delays corresponding to the number of link delays for the first average value. For example, if the predetermined number is 3 as described in the step S720, a fourth link delay measured in the measurement procedure performed before the measurement procedure of the third link delay in the first communication node is referred to as $L_{n-3}$. Also, a fifth link delay measured in the measurement procedure performed before the measurement procedure of the fourth link delay may be referred to as $L_{n-4}$. Also, a sixth link delay measured in the measurement procedure performed before the measurement procedure of the fifth link delay may be referred to as $L_{n-5}$. In this case, the first communication node may calculate the second average of the fourth link delay $L_{n-3}$, the fifth link delay $L_{n-4}$, and the sixth link delay $L_{n-5}$. Specifically, the second average value calculated at the first communication node may be expressed by Equation 4 below.

$$\frac{L_{n-3} + L_{n-4} + L_{n-5}}{3} \qquad \text{[Equation 4]}$$

Thereafter, the first communication node may control the link delay measurement cycle for the second communication node based on a difference between the calculated first average value and the calculated second average value (S740). Controlling the link delay measurement cycle at the first communication node for the second communication node may mean controlling a period at which the first message is transmitted at the first communication node. For example, when the first average value is $M_n$ and the second average value is $O_n$, the difference between the first average value and the second average value may be expressed by Equation 5 below.

$$M_n - O_n$$

Specifically, a method for controlling the link delay measurement cycle for the second communication node based on the difference between the first average value and the second average value which is expressed by Equation 5 at the first communication node will be described below with reference to FIG. 9.

Figure 9:
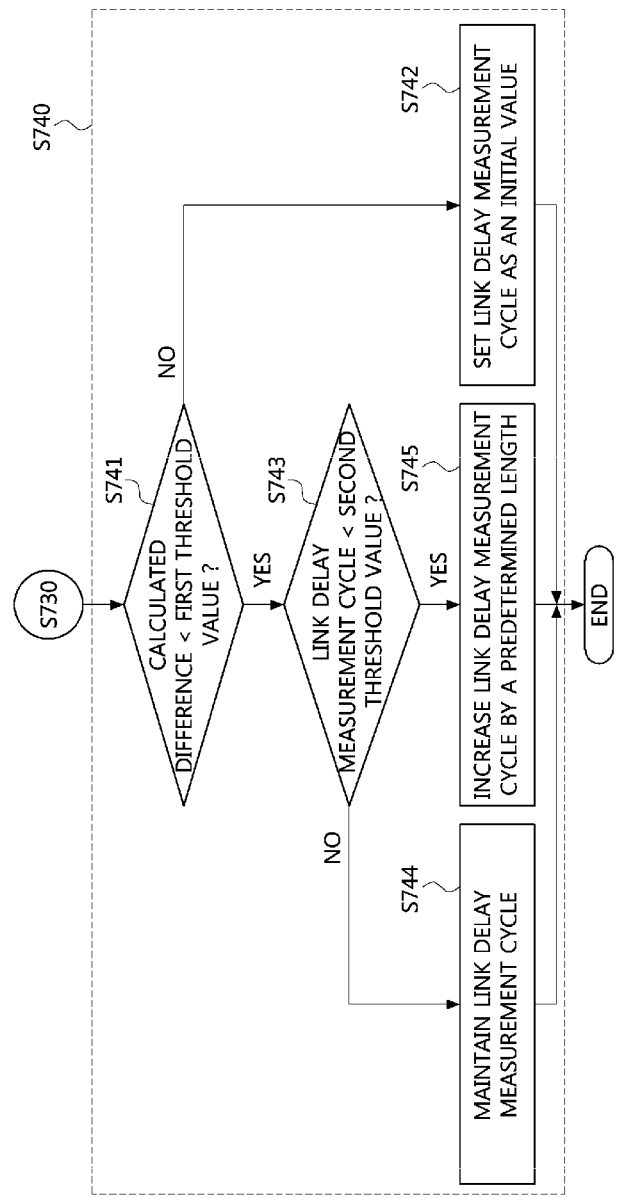
FIG. 9 is a flowchart for explaining a method of controlling a link delay measurement cycle in a vehicle network according to another embodiment of the present disclosure.

FIG. 9 is a flowchart for explaining a method of controlling a link delay measurement cycle in a vehicle network according to another embodiment of the present disclosure.

Referring to FIG. 9, the first communication node may compare the calculated difference with a first threshold value for controlling the link delay measurement cycle for the second communication node (S741). That is, comparing the difference calculated at the first communication node with the first threshold value may mean determining the degree of change of the link delays for the second communication node. For example, if the difference calculated at the first communication node is below the first threshold value, it may mean that the change in the link delays for the second communication node is not relatively large. On the other hand, if the difference calculated at the first communication node is equal to or greater than the first threshold value, it may mean that the change in the link delays for the second communication node is relatively large.

Thereafter, if the calculated difference is equal to or greater than the first threshold value, the first communication node may set the link delay measurement cycle to a predetermined initial value (S742). For example, the predetermined initial value may be set to a value that is smaller than a minimum value to which the measurement period of the link delay can be reduced.

On the other hand, if the calculated difference is less than the first threshold value, the first communication node may compare the link delay measurement cycle with a second threshold, which is the maximum value of the link delay measurement cycle (S743). The second threshold value, which is the maximum value of the link delay measurement cycle, may mean a maximum value to which the transmission cycle of the first messages transmitted from the first communication node can increase. For example, the second threshold, which is the maximum value of the link delay measurement cycle, may be preset in the first communication node. Then, the first communication node may control the link delay measurement cycle based on the comparison result between the link delay measurement cycle and the second threshold value.

Specifically, when the link delay measurement cycle is equal to or greater than the second threshold value, the first communication node may maintain the link delay measurement cycle (S744). That is, when the link delay measurement cycle is equal to or greater than the second threshold value, the first communication node may determine that the current link delay measurement cycle is the maximum value. Accordingly, since the first communication node cannot increase the link delay measurement cycle, the first communication node may maintain the link delay measurement cycle. On the other hand, if the link delay measurement cycle is less than the second threshold, the first communication node may increase the link delay measurement cycle by a predetermined length (S745). The predetermined length for increasing the link delay measurement cycle at the first communication node may be preset within the maximum value to which the link delay measurement cycle can be increased.

Through the method as described above, in the vehicle network according to an embodiment of the present invention, the first communication node may control the link delay measurement cycle for performing time synchronization for the second communication node. That is, in the vehicle network, the first communication node may increase the link delay measurement cycle if the link delay for the second communication node is relatively constant. On the other hand, in the vehicle network, the first communication node may reduce the link delay measurement cycle if the link delay for the second communication node is not relatively constant. Accordingly, the first communication node in the vehicle network may reduce a load in the process of measuring the link delays during the time synchronization for the second communication node.

FIG. 10 is a sequence chart for explaining a second embodiment of a method for measuring a link delay in a vehicle network.

Referring to FIG. 10, a vehicle network may include a first communication node 1010, a second communication node 1020, and a third communication node 1030. The first communication node 1010 and the second communication node 1020 may perform the same or similar functions as the end node shown in FIG. 1. The third communication node 1030 may perform the same or similar functions as the switch shown in FIG. 1. The first communication node 1010, the second communication node 1020, and the third communication node 1030 may be configured the same as or similarly to the communication node shown in FIG. 2. The first communication node 1010 may perform a function of a master node in a vehicle network, and the second communication node 1020 may perform a function of a slave node. Also, the third communication node 1030 may perform a function of a switch. In FIG. 10, when there is a communication node that performs a function of a switch in the vehicle network, a method of measuring the link delay at the communication node and a method of controlling the measurement period of the link delay will be described.

In the vehicle network, the first communication node 1010 and the third communication node 1030 may perform time synchronization to perform communications with each other. That is, the link delay between the first communication node 1010 and the third communication node 1030 may be measured for time synchronization between the first communication node 1010 and the third communication node 1030. Specifically, the third communication node 1030 may generate a first message requesting measurement of a link delay, and may transmit the generated first message to the first communication node 1010. The first communication node 1010 may then receive the first message from the third communication node 1030. The first communication node 1010 may then generate a second message that is a response to the first message, and may transmit the generated second message to the third communication node 1030. The first communication node 1010 may then generate a third message that is a response to the first message, and may transmit the generated third message to the third communication node 1030. Here, the measurement procedure of the link delay performed between the first communication node 1010 and the third communication node 1030 may be the same as the measurement procedure performed between the first communication node 310 and the second communication node 320 described with reference to FIG. 3.

At this time, the third communication node 1030 may control the link delay measurement cycle for the first communication node 1010 based on the measured link delays between the first communication node 1010 and the third communication node 1030. Specifically, a method for controlling the link delay measurement cycle for the first communication node 1010 at the third communication node 1030 may be the same as that described with reference to FIGS. 4 to 9.

Then, the second communication node 1020 and the third communication node 1030 may perform time synchronization to perform communications with each other. That is, the link delay between the second communication node 1020 and the third communication node 1030 may be measured for time synchronization between the second communication node 1020 and the third communication node 1030. Specifically, the second communication node 1020 may generate a fourth message requesting measurement of the link delay, and may transmit the generated fourth message to the third communication node 1030.

The third communication node 1030 may then receive the fourth message from the second communication node 1020. The third communication node 1030 may then generate a fifth message that is a response to the fourth message and transmit the generated fifth message to the second communication node 1020. The third communication node 1030 may then generate a sixth message that is a response to the fourth message and may transmit the generated sixth message to the second communication node 1020. Here, the link delay measurement procedure performed between the second communication node 1020 and the third communication node 1030 may be the same as the link delay measurement procedure performed between the first communication node 310 and the second communication node 320 described with reference to FIG. 3.

In this case, the second communication node 1020 may control the link delay measurement cycle for the third communication node 1030 based on the measured link delays between the second communication node 1020 and the third communication node 1030. Specifically, a method for controlling the link delay measurement cycle for the third communication node 1030 at the second communication node 1020 may be the same as that described with reference to FIGS. 4 to 9.

As described above, when there is a communication node that performs a function of a switch among a plurality of communication nodes in the vehicle network, the measurement period of the link delay between the communication node performing the function of the master node and the communication node performing the function of the switch can be controlled, and the measurement period of the link delay between the communication node performing the function of the switch and the communication node performing the function of the slave node can be controlled.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A first communication node in an Ethernet-based vehicle network, comprising a processor and a memory storing at least one instruction executed by the processor, wherein the at least one instruction is configured to:
measure a first link delay for performing time synchronization with a second communication node included in a plurality of communication nodes;
calculate a difference between the first link delay and an average value of a plurality of link delays measured before the measurement of the first link delay;
compare the calculated difference with a first threshold value for controlling a link delay measurement cycle for the second communication node; and
control the link delay measurement cycle for the second communication node based on the comparison result,
wherein the at least one instruction is further configured to:
compare the link delay measurement cycle with a second threshold value, which is a maximum value of the link delay measurement cycle, when the calculated difference is less than the first threshold value.

2. The first communication node according to claim 1, wherein the at least one instruction is further configured to:
transmit to the second communication node, a first message requesting measurement of the first link delay for the second communication node;
receive from the second communication node, a second message including information on a time at which the first message was received, and a third message including information on a time at which the second message was transmitted; and
measure the first link delay for the second communication node based on the information on the times included in the second message and the third message.

3. The first communication node according to claim 2, wherein the link delay measurement cycle for the second communication node is controlled by controlling a transmission cycle of transmitting the first message at the first communication node.

4. The first communication node according to claim 1, wherein the at least one instruction is further configured to:
control the link delay measurement cycle based on a comparison result between the link delay measurement cycle and the second threshold value.

5. The first communication node according to claim 4, wherein the at least one instruction is further configured to: increase the link delay measurement cycle by a predetermined length when the link delay measurement cycle is less than the second threshold value.

6. The first communication node according to claim 4, wherein the at least one instruction is further configured to: maintain the link delay measurement cycle when the link delay measurement cycle is equal to or greater than the second threshold value.

7. A first communication node in an Ethernet-based vehicle network, comprising a processor and a memory storing at least one instruction executed by the processor, wherein the at least one instruction is configured to:
measure a first link delay for performing time synchronization with a second communication node included in a plurality of communication nodes;
calculate a first average value of a predetermined number of link delays among the first link delay and a plurality of link delays measured before the measurement of the first link delay;
calculate a second average value of the predetermined number of link delays among a plurality of link delays measured before the measurement procedures of the link delays for the first average value; and
control a link delay measurement cycle for the second communication node based on a difference between the calculated first average value and the calculated second average value,
wherein the at least one instruction is further configured to:
compare the calculated difference with a first threshold value for controlling the link delay measurement cycle for the second communication node; and
compare the link delay measurement cycle with a second threshold value, which is a maximum value of the link delay measurement cycle, when the calculated difference is less than the first threshold value.

8. The first communication node according to claim 7, wherein the at least one instruction is further configured to:
transmit to the second communication node, a first message requesting measurement of the first link delay for the second communication node;
receive from the second communication node, a second message including information on a time at which the first message was received, and a third message including information on a time at which the second message was transmitted; and
measure the first link delay for the second communication node based on the information on the times included in the second message and the third message.

9. The first communication node according to claim 8, wherein the link delay measurement cycle for the second communication node is controlled by controlling a transmission cycle of transmitting the first message at the first communication node.

10. The first communication node according to claim 7, wherein the at least one instruction is further configured to:
control the link delay measurement cycle for the second communication node based on a comparison result between the calculated difference and the first threshold value.

11. The first communication node according to claim 10, wherein the at least one instruction is further configured to:
compare the link delay measurement cycle with a second threshold value, which is a maximum value of the link delay measurement cycle, when the calculated difference is less than the first threshold value; and
control the link delay measurement cycle based on a comparison result between the link delay measurement cycle and the second threshold value.

12. The first communication node according to claim 11, wherein the at least one instruction is further configured to set the link delay measurement cycle to a predetermined initial value when the calculated difference is equal to or greater than the first threshold value.

13. The first communication node according to claim 11, wherein the at least one instruction is further configured to increase the link delay measurement cycle by a predetermined length when the link delay measurement cycle is less than the second threshold value.

14. The first communication node according to claim 11, wherein the at least one instruction is further configured to maintain the link delay measurement cycle when the link delay measurement cycle is equal to or greater than the second threshold value.

15. A first communication node in an Ethernet-based vehicle network, comprising a processor and a memory storing at least one instruction executed by the processor, wherein the at least one instruction is configured to:
  measure a first link delay for performing time synchronization with a second communication node included in a plurality of communication nodes;
  calculate a first average value of a predetermined number of link delays among the first link delay and a plurality of link delays measured before the measurement of the first link delay;
  calculate a second average value of the predetermined number of link delays among a plurality of link delays measured before the measurement procedures of the link delays for the first average value; and
  control a link delay measurement cycle for the second communication node based on a difference between the calculated first average value and the calculated second average value,
wherein the at least one instruction is further configured to:
compare the calculated difference with a first threshold value for controlling the link delay measurement cycle for the second communication node; and
set the link delay measurement cycle to a predetermined initial value when the calculated difference is equal to or greater than the first threshold value.

* * * * *